INVENTOR.
JAMES B. MACKAY
BY
Brumbaugh, Free, Graves & Donohue
his ATTORNEYS.

INVENTOR.
JAMES B. MACKAY
BY
Brumbaugh, Free, Graves & Donohue
his ATTORNEYS.

CRYOTRON SWITCHING CIRCUIT

INVENTOR.
JAMES B. MACKAY

BY his ATTORNEYS.

CRYOTRON SWITCHING CIRCUIT

Filed Dec. 17, 1957 5 Sheets-Sheet 4

INVENTOR.
JAMES B. MACKAY
BY
Brumbaugh, Free, Graves & Donohue
his ATTORNEYS.

INVENTOR.
JAMES B. MACKAY
BY
Brumbaugh, Free, Graves & Donohue
his ATTORNEYS.

United States Patent Office 3,023,324

Patented Feb. 27, 1962

3,023,324

CRYOTRON SWITCHING CIRCUIT

James B. Mackay, Poughkeepsie, N.Y., assignor to International Business Machines Corporation, New York, N.Y., a corporation of New York Filed Dec. 17, 1957, Ser. No. 703,445
29 Claims. (Cl. 307—88.5)

Figure 1A:
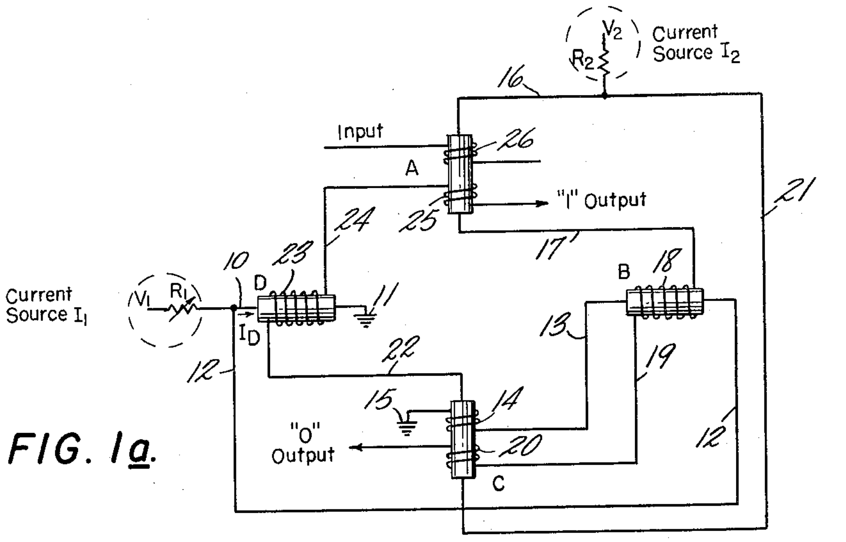

This invention, generally, relates to cryogenic circuits and, more particularly, to circuits having cryotron-type superconductive circuit components.

The importance of the superconductivity characteristics of certain materials has only recently been appreciated. As a component in an electrical circuit, the cryotron is embodied in the form of a gate conductor which may be a straight piece of wire approximately one inch in length. It is maintained at a temperature in the vicinity of 0° Kelvin (absolute zero) while a control conductor which may be a coil of superconductive material permits the development of a magnetic field for controlling the resistivity state of the cryotron. For example, when the magnetic field is applied, the cryotron exhibits a resistance to the flow of electrical current; whereas, the resistance is reduced to essentially zero when the magnetic field is removed. Thus, control over the magnetic field permits control of the resistance of the material in the magnetic field by causing it to shift from its superconducting state to its normal resistance state and back without changing the temperature.

It is an object of this invention to provide an electrical circuit having cryotron components.

A further object of the invention is to provide a multivibrator-type circuit embodying superconductive components.

A still further object of the invention is to provide a cryogenic multivibrator circuit.

An even further object of this invention is to provide a new and improved electrical circuit embodying cryogenic components.

Another object is to provide bistable, monostable and astable multivibrator type circuits which employ superconductive components.

Another object is to provide a cryogenic binary input trigger circuit, that is, a bistable circut capable of being successively switched between its stable states in response to each of a plurality of like signals applied at a single input terminal for the circuit.

A further object is to provide an improved cryogenic shift register comprising a plurality of stages each consisting of a bistable circuit, wherein information may be successively transferred directly from one stage to the next under the control of a single series of clock pulses.

Still another object is to provide circuitry of the above described type employing a plurality of interconnected and interdependent cryogenic circuits having different time constants of switching.

These and other objects and advantages of an electrical circuit constructed and arranged in accordance with the invention are obtained by a unique connection of superconductive elements as operative components of the circuit. Basically, there are at least two superconductor current paths in parallel, each path having at least one superconductive component which may be termed a gate conductor and which may be selectively driven into a resistive state. An electric current flow in one superconductive component is coupled magnetically with a second superconductive component and, conversely, an electric current flow in the second superconductive component is coupled magnetically with the first superconductive component. In this manner, a flow of electric current in one component controls automatically the conductivity of the second component. The magnetic fields are applied to the various superconductor components in the circuit by control conductors which remain superconductive since they are fabricated of a superconductor material which is "hard" relative to that of the gate conductor components. By this, it is meant that a larger magnetic field is required to drive the control conductors resistive at the operating temperature than is required to drive the gate conductors resistive.

When one of the conditions mentioned above obtains, for example, an electric current is flowing through a first superconductive component, then a second superconductive component is maintained in its normal resistive state due to a magnetic field developed by this electric current flow in a control conductor which may take the form of a winding positioned in inductive relation with the second superconductive component. This condition maintains itself until the current flow is interrupted by, for example, a current pulse of sufficient magnitude and duration coupled magnetically with the first superconductive component. The magnetic field developed by the current pulse causes the first superconductive component to become resistive, thus decreasing the electric current flowing therethrough and also through the winding associated with the second superconductive component. With this reduction of current flow, the resistance of the second component becomes zero, or, in other words, it becomes superconductive, thereby permitting the electric current previously flowing through the first component to flow now through the second component. This condition is maintained until a magnetic field of sufficient strength is developed to restore the normal resistance of the second component. The control of the rate at which this magnetic field is developed will be described in greater detail hereinafter.

Figure 1B:
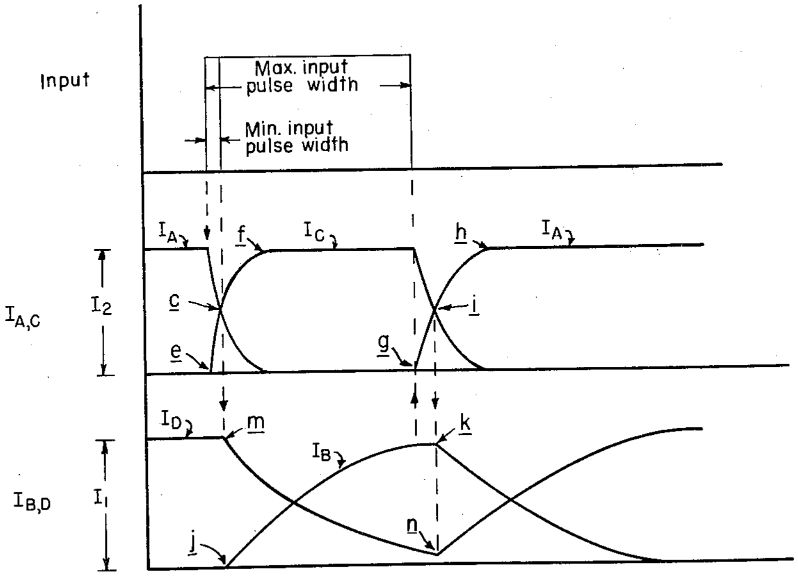
Figure 2A:
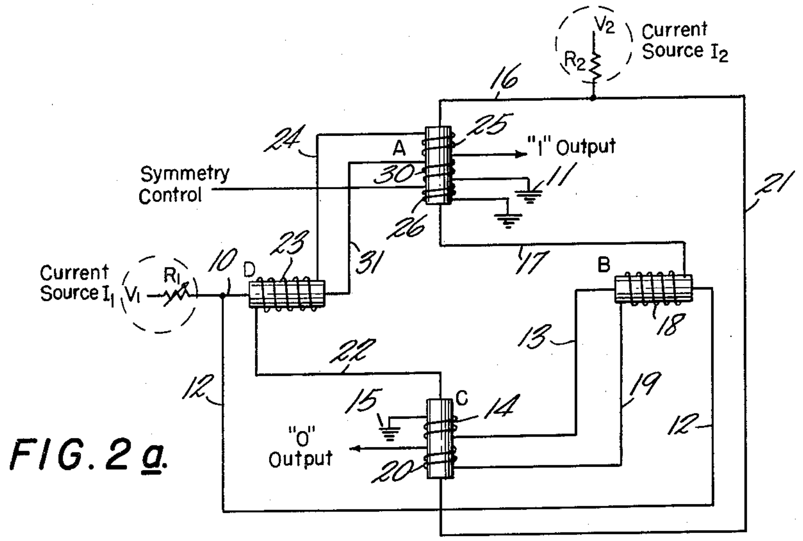
Figure 2B:
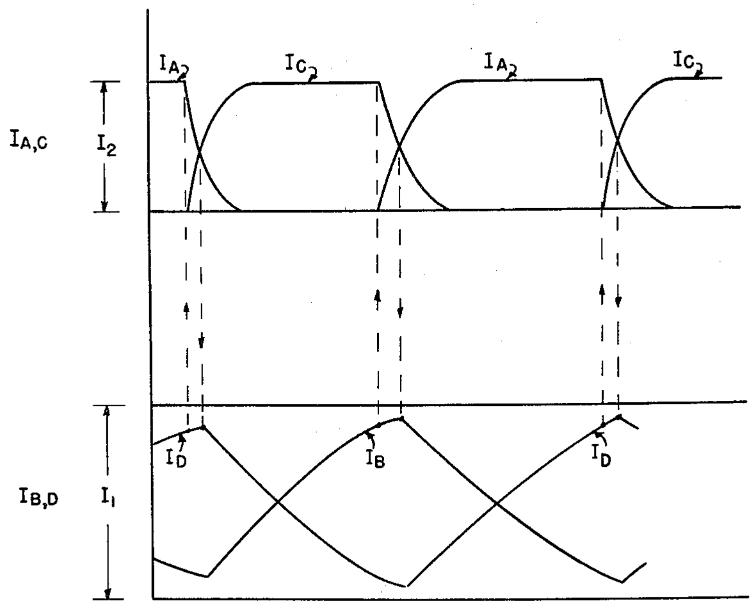
Figure 3A:
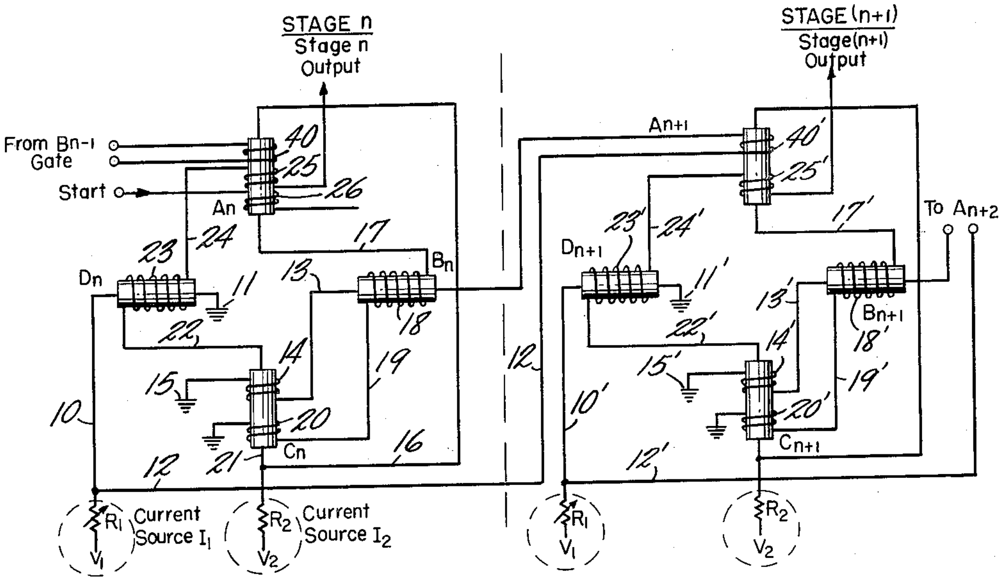
Figure 3B:
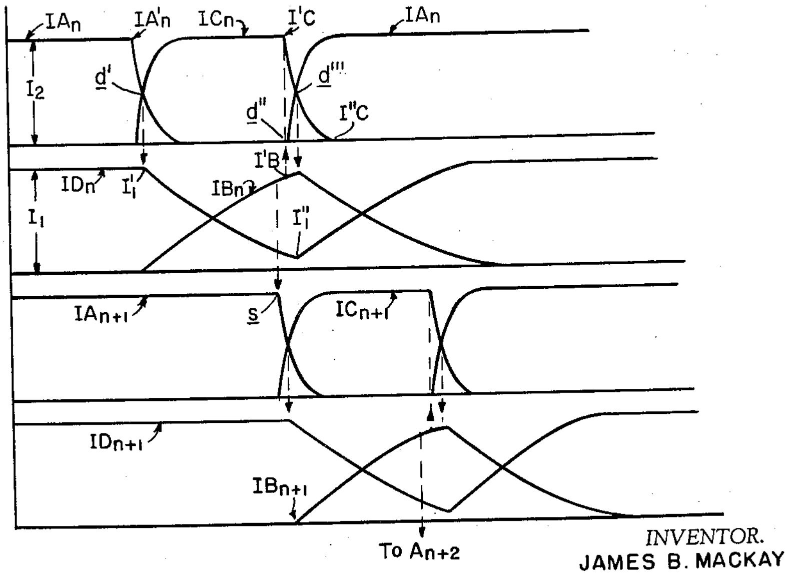

For a more complete understanding of these and other objects of the present invention, reference may be had to the description which follows and to the accompanying drawings in which:

FIGURE 1*a* shows diagrammatically a single-shot multivibrator-type electric circuit constructed and arranged according to the invention;

FIGURE 1*b* is a timing chart showing the relative operative relationship of the various electric currents in the circuit shown in FIGURE 1*a*;

FIGURE 2*a* shows diagrammatically the circuit of FIGURE 1*a* modified to operate in a free-running, multivibrator-type manner with continuous D.-C. control;

FIGURE 2*b* is a timing chart showing the relative operative relationship of the various electric currents in the circuit shown in FIGURE 2*a*;

FIGURE 3*a* shows diagrammatically the interconnection of a plurality of circuits as shown in FIGURE 1*a* to operate in a multi-stage ring;

FIGURE 3*b* is a timing chart showing the relative operative relationship of the various electric currents in the circuit shown in FIGURE 3*a*.

Figure 4A:
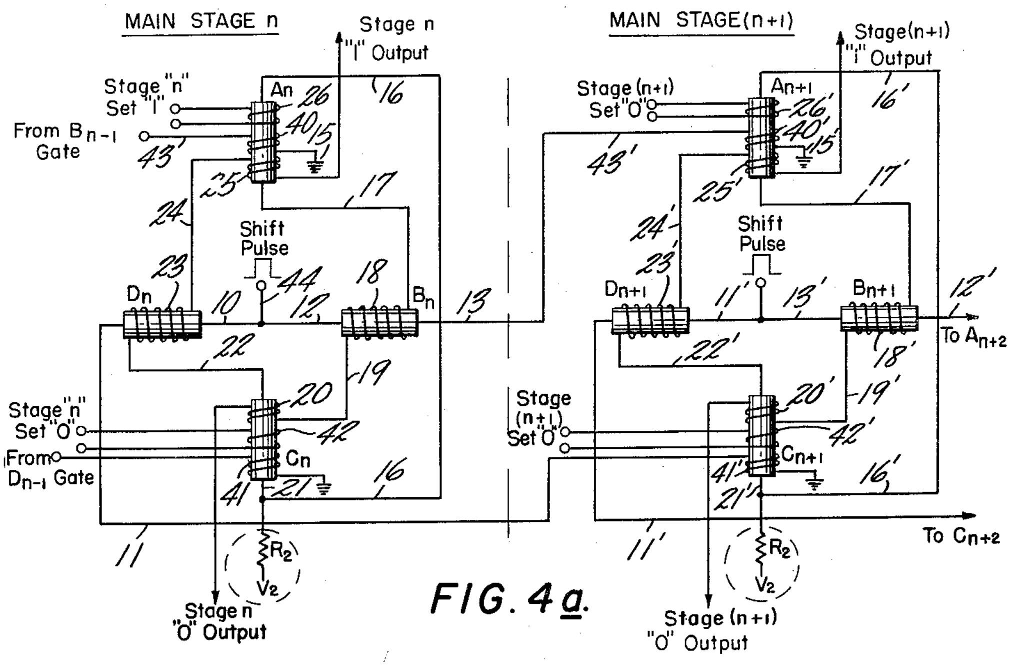
Figure 4B:
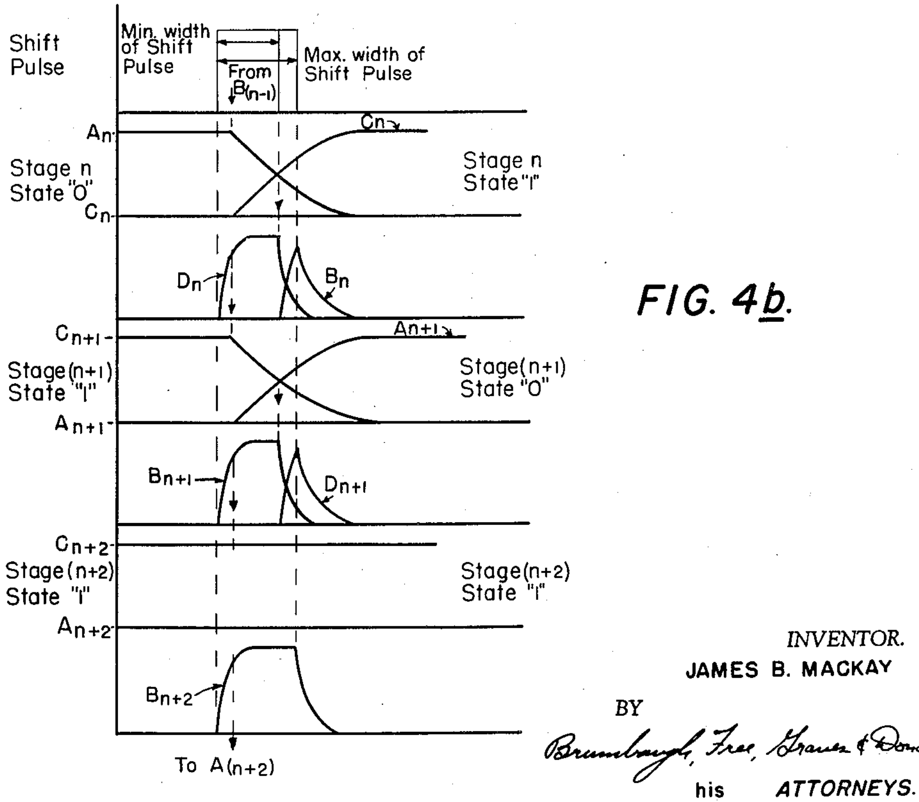
Figure 5A:
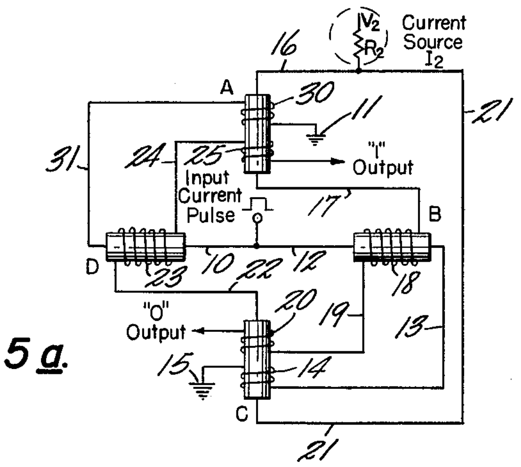
Figure 5B:
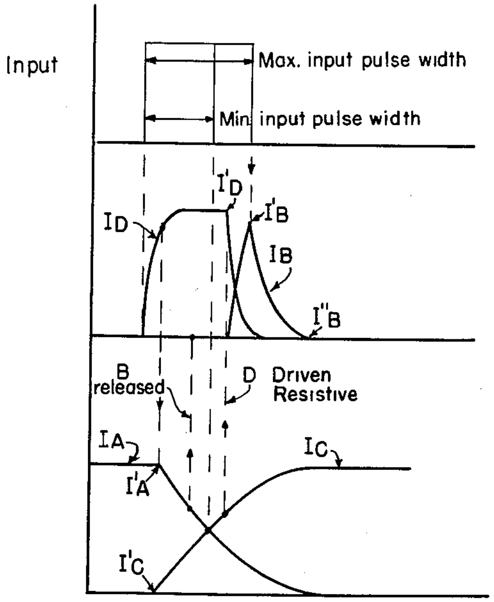
Figure 5C:
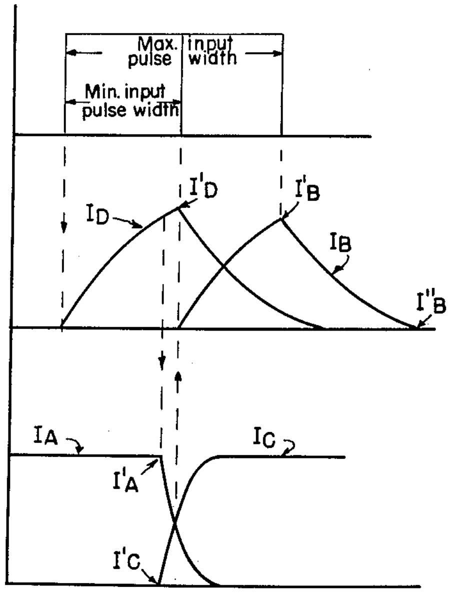

FIGURE 4*a* shows diagrammatically the interconnections of a plurality of circuits as shown in FIGURE 1*a* which have been modified to operate as a single step shift register;

FIGURE 4*b* is a timing chart showing the relative operative relationship of the various electric currents in the circuit shown in FIGURE 4*a*;

FIGURE 5*a* shows diagrammatically the circuit of FIGURE 2*a* which has been modified to be controlled by electric current pulses and is operable as a binary input trigger;

FIGURE 5*b* is a timing chart for the circuit shown in FIGURE 5*a* wherein each of the various superconductive components have a selected time constant; and FIGURE 5*c* is a timing chart similar to FIGURE 5*b* but showing a different time constant for each of the superconductive components.

Referring to FIGURE 1*a* of the drawings, the letters A, B, C, and D identify, respectively, four cryotron elements representing operative components in an electrical circuit to be described in detail presently. The particular material of which these cryotron elements are made may be chosen from those materials which exhibit superconductive characteristics, as, by way of example, lead, tin, niobium, or tantalum, it being understood that the invention is not limited to a specific superconductive material. Since the cryogenic phenomenon of superconductivity is now well known in the art, a detailed description of the operating characteristics of a cryotron element is deemed unnecessary. For more particulars on the subject, reference may be made to an article by D. A. Buck which appeared in the Proceedings of the IRE for April 1956, pages 482–493.

A representative embodiment of the invention, as will now be presented in detail, is illustrated in FIGURE 1*a* of the drawings. Two separate electric currents $I_1$ and $I_2$ are provided by separate voltage sources $V_1$ and $V_2$, respectively, through resistive elements $R_1$ and $R_2$, respectively. The sources $V_1$ and $V_2$ may be replaced by a single source and the two currents supplied through appropriate resistive elements connected to this source. Each of these currents $I_1$ and $I_2$ has two possible parallel paths. Since al of the paths are fabricated completely of superconductive material and it is only the gate conductor components which are driven resistive, the manner in which the currents $I_1$ and $I_2$ flow is determined by the state of the superconductive gate conductor components of cryotrons A, B, C and D. For example, the current $I_1$ may flow either through a conductor 10 and a cryotron D to a terminal 11 of a superconducting ground return, or alternatively, through a conductor 12, a cryotron B, a conductor 13, a winding 14 positioned in inductive relation with a cryotron C, to another terminal 15 of the superconducting ground return.

Similarly, the current $I_2$ may flow either through a conductor 16, a cryotron A, a conductor 17, a winding 18, positioned in inductive relation with the cryotron B, a conductor 19, a winding 20 positioned in inductive relation with the cryotron C, to an output terminal designated "0," or alternatively, through a conductor 21, the cryotron C, a conductor 22, a winding 23 positioned in inductive relation with the cryotron D, a conductor 24, a winding 25 positioned in inductive relation with the cryotron A, to an output designated "1." The terminals "0" and "1" are connected through further superconductive circuitry to a common junction or superconducting ground return.

The characteristics of the parallel paths formed by cryotrons A and C mentioned above are such that a predetermined fraction of the current $I_2$, typically between 40% $I_2$ and 90% $I_2$, is required in either path to maintain the gate conductor component in the other path resistive. If, for example, ignoring for the present the effects of cryotrons B and D, the operation of the circuit is considered when, with the entire current $I_2$ in path A, a resistance is introduced in this path which is approximately equal to the resistance then in path C, that is the resistance of cryotron C which is in a nonsuperconductive state, current begins to shift from path A to path C to approach a distribution wherein the current in each of the then equally resistive paths is 50% $I_2$. The manner in which this current shifting is carried to completion varies in accordance with whether the magnitude of the current in windings 20 and 25 to drive cryotrons C and A resistive is greater or less than 50% of the current $I_2$. However, the current is completely shifted as long as the magnitude of the resistance externally introduced into path A, for example by energizing winding 26, is sufficient to ensure that enough current is shifted to caused cryotron A to be driven resistive and cryotron C to become superconductive. This resistance must be maintained until the state of both these cryotrons is so changed. Once this is accomplished, the externally introduced resistance may be removed, for example, by de-energizing winding 26, and regenerative switching is initiated which causes the current $I_2$ to continue to shift until it is entirely in the completely superconductive path including cryotron C. Where the resistance introduced in the path in which the current $I_2$ is flowing is equal to the resistance then present in the other path, the current required by windings 20 and 25 to drive cryotron components C and A resistive may not be less than 33⅓% $I_2$. In the illustrative embodiments of the invention depicted herein, the current required by these windings to drive the associated cryotron components resistive is 50% $I_2$ and, thus, the resistance introduced to cause complete switching of the current from one path to the other must be maintained until more than half of the current $I_2$ has been shifted.

Now consider the effect of cryotrons B and D which are controlled respectively by coil 18 in path A and coil 23 in path C. The percentage of the current $I_2$ required by these windings to drive cryotron components B and D resistive may vary between wide limits above and below 50% $I_2$ and need not be the same as that required by windings 20 and 25 to drive cryotrons C and A resistive. However, it is preferable that the critical current for windings 18 and 23 be at least 50% $I_2$ so that cryotrons B and D are not simultaneously resistive, and, in the illustrative embodiments, the critical current for these windings is 50% $I_2$.

It should be noted that the critical current required by any of these windings to drive the associated cryotron components resistive is dependent upon a number of factors, among which are the actual magnitude of the current $I_2$, the superconductor materials of which the gate conductor components are fabricated, the geometry and/or pitch of the control conductors, the operating temperature, and the geometry of the gate conductor components. The critical current value, or better here, the critical percentage of the current $I_2$, and similarly the critical percentage of the current $I_1$, required by each of the windings through which either of these currents flow to render it effective to maintain the associated cryotron gate component resistive, may be varied by varying one or more of these factors.

A winding 26 is positioned in inductive relation with the cryotron A such that when a current pulse of sufficient magnitude and duration is applied to this winding 26, the cryotron A is made sufficiently resistive to reduce the current flow therethrough to less than 50% of the value of the current $I_2$.

Also, the time constant of each of these circuit paths including the cryotrons A and C in which the current $I_2$ flows is relatively small, as represented in FIGURE 1*b*, for example, by the time required for the current $I_C$ to reach the value at point *f* from the point *e*. Contrasted with the time constants of the circuits including cryotrons A and C, the time constants of the circuits including the cryotrons B and D are relatively large as indicated by the length of time in FIGURE 1*b* from the points *j* to *k* and *m* to *n*, respectively. It should be noted at this point that the pulse diagrams of FIGURE 1*b* as well as other pulse diagrams later to be described are somewhat idealized to simplify the illustration of the principles of the invention. The curves have been simplified in depicting the changes in current $I_A$ and $I_C$, the total current $I_2$ being shown to be shifted between these paths along single exponential curves, though actual curves depicting these shifts comprise portions of at least two and sometimes three exponential curves. Thus, whereas the segments *ef* and *gh* of curves $I_C$ and $I_A$, respectively, indicate the shifting of the entire current $I_2$ from cryotron A to cryotron C and thence back to cryotron A, in actual operation not quite all of the current $I_2$ is shifted during the time intervals *ef* and *gh*. For a more detailed description of the switching characteristics of cryotrons and cryotron currents, reference may be made to chapter III of report 7138–R–15 of the Servomechanisms Laboratory, M.I.T., entitled "The Cryotron as a Storage Element" by J. O. Morin; October 15, 1956.

Since the time constants for these circuits are dependent upon the ratio of inductance to resistance, they may be varied in a number of ways, for example, by varying the pitch of the various coils, the geometry and/or material of which the cryotron gates are fabricated, or the inductance of the connecting leads. In this regard, reference may be made to copending application Serial No. 625,512 filed November 13, 1956, in behalf of Richard L. Garwin and assigned to the assignee of the subject application. This copending application is directed toward thin film cryotrons and illustrates the manner in which the inductance and resistance of such devices can be altered. It should be here noted that, though the embodiments of the subject invention are shown to employ wire wound cryotrons, this showing is by way of illustration and not limitation and the invention may also be practiced using thin film cryotrons of the type described in the above-cited copending application.

In operation, the normal flow of the current $I_2$ is through the cryotron A, the windings 18 and 20, respectively, and provides a continuous current output at the terminal designated "0." To facilitate the description, the flow of the current $I_2$ through this path will be designated $I_A$. These windings 18 and 20, due to the current $I_A$, maintain the cryotrons B and C resistive and, with cryotron B resistive, the flow of the current $I_1$ is through the superconductive cryotron D. Upon the application of a pulse of electric current at the input winding 26 on the cryotron A, the cryotron A is made sufficiently resistive to reduce the flow of the current $I_A$ to less than 50% of the value of $I_2$. This critical value is represented by the point c on the curve in FIGURE 1*b*. As the current $I_A$ through the cryotron A is reduced, the current flow $I_C$ through the cryotron C is increased along the line *ec* in FIGURE 1*b* such that at the point *c* the current flow $I_C$ through the cryotron C and the winding 25 is sufficient to render this winding effective to maintain cryotron A resistive and the current shift continues until the point *f* is reached on the curve in FIGURE 1*b*. At this point, the current flow $I_C$ through the conductor 21, the cryotron C, the windings 23 and 25 to the output designated "1" is substantially equal to the value $I_2$.

Coincident with the reduction of the current $I_A$ below 50% $I_2$ and increase of the current $I_C$ above 50% $I_2$, cryotron B becomes superconductive and the cryotron D resistive, thereby initiating the shifting of the current $I_1$ from path D to path B. This current shift is depicted by the segments *jk* and *mn* in FIGURE 1*b*. The current in path B energizes winding 14 which is inductively associated with cryotron C. However, there is an appreciable time delay before cryotron C is driven resistive by winding 14. This delay is due to the long time constant of the circuit in which the current $I_1$ flows and the fact that essentially 90% of this current is required to render winding 14 effective to drive cryotron C resistive. Therefore, the current $I_2$ remains in path C until 90% of the current $I_1$ has been shifted from path D to path B. At this time winding 14, by driving cryotron C resistive, initiates the switching of the current $I_2$ back from path C to path A. The re-establishing of the current $I_2$ in path A is represented by the segment *gih* in FIGURE 1*b*, the letter *i* designating the point at which 50% of the current has been shifted. At this point windings 18 and 20 are again rendered effective to maintain cryotrons B and C, respectively, resistive and coils 23 and 25 lose control of cryotrons D and A so that these cryotrons again become superconductive. The shift of current $I_2$ continues until all of this current is in path A and, with cryotron B resistive and cryotron D superconductive, the entire current $I_1$ is shifted to path D. The circuit thus reassumes its initial condition and the circuit maintains itself in this condition until another input pulse is applied to input winding 26.

The duration of the input pulse to the winding 26 may be any desired time but it must not exceed a time shortly before the point *g* is reached on the curve in FIGURE 1*b*. Therefore, when the cryotron C is made resistive by the effect of the current $I_B$ in the winding 14, the current $I_C$ is reduced to zero, the magnetic effect of the winding 25 is reduced, the cryotron A again becomes superconductive, and the current $I_2$ returns to its original path through the cryotron A to the "0" output and, in this manner, the operation of the circuit is returned to its initial condition. Thus, upon each application of an input current pulse to the winding 26, the path of the current $I_2$ is shifted from the output "0" to the output "1" and back.

The width of the output pulse at the terminal designated "1" can be adjusted within wide limits, for example, by altering the magnitude of the current $I_1$, so that the current $I_B$ drives the cryotron C resistive at a point anywhere between 10% and 95% of the value of the current $I_1$. One pulse width for a selected value of $I_1$ is shown between the points *c* and *i* in FIGURE 1*b*. The adjustment of the magnitude of the current $I_1$ may be accomplished by the variable resistor $R_1$ associated with the source $V_1$. On the other hand, it is also possible to vary the width of this output pulse by positioning a third winding in inductive relation with the winding 14 on cryotron C to carry an adjustable bias current to accomplish the same purpose.

For the particular embodiment of the invention shown in FIGURE 1*a*, the cryotrons A and C carry two windings each. However, since the operation of the circuit does not depend on the magnetic fields of these two windings being superimposed, it is not necessary that the windings be magnetically coupled. In other words, these windings may be wound side by side on these cryotrons, or if desired, two cryotrons connected in series each carrying one winding, may be substituted for each cryotron A and C.

The output currents can be used directly provided no resistance is included in their path. Any resistance inserted, even briefly, in the "0" output lead would trigger the circuit in a manner similar to a current pulse in the winding 26. Unintentional triggering of the circuit by voltages induced in the output lead by a load can be prevented by returning the output currents directly to a common junction through superconducting control windings on additional cryotrons (not shown).

The circuit described above and shown in FIGURE 1*a* may be operated as a free-running multivibrator-type circuit which is self-starting and continuous in its operation by adapting it as shown in FIGURE 2*a* of the drawings. It will be noted that the only change in the circuit over that shown in FIGURE 1*a* is that the current flow $I_D$ through the conductor 10 and the cryotron D is now 1*a* except that a coil 40' is placed in inductive relation with the cryotron A. With this arrangement, the circuit will operate as shown by the timing chart in FIGURE 2*b*.

It should be noted that though, as has been stated above, in embodiments of the type shown in FIGURE 1 the critical value of current required by winding 14 to drive cryotron C resistive may vary between wide limits above and below 50% $I_1$, it is preferable in circuits of the type shown in FIGURE 2 that the critical current for winding 14 and winding 30 be above 50% $I_1$.

The operation is similar to that of the circuit shown in FIGURE 1*a* with the exception that the magnetic effect of the winding 30, due to the current $I_D$ and the relatively large time constant of the path including the cryotron D, will be sufficient to render the cryotron A resistive. Without the winding 30, it is necessary that pulses of electric current be supplied as described in connection with the circuit arrangement of FIGURE 1*a*.

Also, the circuit arrangement, as shown in FIGURE 1*a*, may be adapted to operate with similarly constructed circuits to form a free-running multi-stage ring as shown in FIGURE 3*a* of the drawings. Each stage *n* in FIGURE 3*a* is substantially the same as that shown in FIGURE 1*a* except that a coil 40' is placed in inductive relation with a cryotron A in a next succeeding stage and is connected in series with the conductor 12 connecting the current source $I_1$ to the cryotron B. In other words, each stage of the multi-stage ring, shown in FIGURE 3*a*, consists of one of the single-shot multivibrator-type circuits, described above in connection with FIGURE 1*a*, with the curernt $I_B$ through the cryotron B of each stage energizing an input winding 40 on the cryotron A of the next succeeding stage. The pitch of the windings is such that current $I_{Bn}$ drives the cryotron $A_{n+1}$ resistive slightly before the cryotron $C_n$ is driven resistive. The timing chart, FIGURE 3*b*, shows that unless this is done, there is a possibility of current $I_{Bn}$ decaying before the stage $_{n+1}$ is triggered sufficiently to completely flip. The output pulses from successive stages therefore will have a slight overlap.

It should be noted that this ring will not be self-starting, so an extra start winding 26 must be placed in inductive relation with the cryotron A of one or more stages to permit starting in any position. However, once started, the ring will be free-running.

If it is desired to have different stages provide different widths of output pulses, then the $R_1$ rheostats associated with each of the voltage sources $V_1$, or a single such source may be employed, can be individually adjusted (or other means may be used such as interleaved bias windings in series on the cryotrons $C_n$ and $A_{n+1}$). The speed of the entire circuit may be altered by adjusting the voltage $V_1$ for each stage in which case all of the stages will be affected in the same proportion.

As previously stated, the construction of each stage of the circuit shown in FIGURE 3*a* is basically the same as that shown in FIGURE 1*a*. However, the operation of the interconnected circuits of FIGURE 3*a* may best be understood by reference to FIGURE 3*b*.

Initially, the current $I_2$ of stage *n* will flow through the cryotron A of this stage and is designated $I_{An}$. At a point $I'_{An}$ on this curve, the cryotron A will be driven resistive by a current in the winding 40. Due to the relatively small time constant of this circuit, the current $I_A$ will decay rapidly and the current $I_{Cn}$ will build up equally rapidly. At an intersection *d'* when the current $I_2$ is equally divided between the cryotron circuits A and C, the current flow $I_C$ through the cryotron C and the winding 23 will render the cryotron $D_n$ resistive and due to its relatively large time constant, the current decay will be relatively slow and will follow the line $I'_1$—$I''_1$. The current $I_C$ will flow through the circuit including cryotron C until the current $I_B$ builds up in the cryotron B and reaches a value represented on the chart by the point $I'_B$, at which time the magnetic effect of the winding 14 will drive the cryotron C resistive and the current $I_C$ will begin decreasing rapidly from the point $I'_C$ to the point $I''_C$. The pitch of the winding 40' in the next succeeding stage $n+1$ is such that for a current value slightly less than $I'_B$, the magnetic effect of the winding 40' is sufficient to drive the cryotron $A_{n+1}$ resistive, indicated by the point *s* in the chart. It is at this point that the operation of the next succeeding stage in the ring is initiated, and the operation thereof will be the same as that just described for the preceding stage.

With the current $I'_{Cn}$ decreasing in value, the current $I_{An}$ increases from the point *d''* to the point *d'''*, the current $I_{An}$ will be of sufficient value in the winding 18 to cause the cryotron $B_n$ to become resistive and, due to the relatively large time constant of this circuit, the current $I_{Bn}$ begins to decrease relatively slowly. As can be seen from the timing chart in FIGURE 3*b*, the currents $I_{An+1}$ and $I_{Dn+1}$ are substantially the same as for the preceding stage.

A plurality of the circuits of the type shown in FIGURE 2*a* may be connected together as shown in FIGURE 4*a* to operate in a shifting manner such that information represented by particular superconductive states of the various elements in one stage may be set up in the next succeeding stage by a simple shift operation. Such a circuit arrangement is accomplished by connecting the conductors 10 and 12 together in series and providing a current pulse input terminal 44 to this connection. Further, the conductor 13 is connected to a conductor 43' in the next succeeding stage to permit the current $I_{Bn}$ to develop a magnetic effect on the cryotron $A_{n+1}$ by means of a winding 40'. The current $I_{Dn}$ develops a magnetic effect on the cryotron $C_{n+1}$ through conductor 11 and a winding 41' in the next succeeding stage. The winding 26 in inductive relation with cryotron $A_n$ is used to receive information to be read into each stage of this modified circuit. A similar connection is provided for the cryotron $C_n$ by a winding 42 placed in inductive relation with this cryotron to read in information represented by the desired state of superconductivity of cryotron $C_n$.

The operation of a circuit modified in this manner may be understood by referring to FIGURE 4*b* of the drawings in which there is shown the relative relationship of the various currents in the circuit. In this instance, it should be noted that the cryotrons A and C and the associated series-connected windings have a large time constant which is contrary to that of FIGURE 2*a*, and the circuits including the cryotrons B and D have a relatively small time constant.

Assume initially that the cryotrons $A_n$ and $D_n$ are superconducting. Then, a pulse of electric current applied to the terminal 44 will, after an initial transient distribution which is not shown, flow through the cryotron $D_n$ but not through the cryotron $B_n$. The cryotron $C_{n+1}$ of the next succeeding stage will now be driven resistive causing that stage to adopt the same state as the preceding stage. Subsequently, a repeated shift pulse transfers the information-representing state of each stage to the next succeeding stage.

The minimum input pulse width is taken as that which causes a sufficient shift of current $I_2$ between the cryotrons A and C of each stage to initiate regenerative action. In the illustrative embodiment this action is initiated when half of the current $I_2$ is shifted. The maximum input pulse width is that which just fails to allow the new state of any stage to influence the following stage. It should be noted that there is no need for an intermediate stage with this circuit arrangement. Also, information may be fed into any stage between shifts via the set "0" or set "1" windings 42 and 26, respectively.

Assume, as a particular instance, that the current $I_2$ is flowing through conductor 16, cryotron $A_n$, conductor 17, winding 18, conductor 19, winding 20, to the output designated "0." This current flow through the winding 18 renders the cryotron $B_n$ resistive, and also, the cryotron $C_n$ is rendered resistive. Since no current is flowing through the conductor 22 and the winding 23, the cryotron $D_n$ is superconductive. Assume also that the next succeeding stage is in the particular state in which the cryotrons $A_{n+1}$ and $D_{n+1}$ are resistive. Then, the $I_2$ in that stage will flow through conductor 21', cryotron $C_{n+1}$, conductor 22', winding 23', conductor 24', winding 25' to the output terminal designated "1" in the stage $n+1$.

To cause this next succeeding stage $n+1$ to assume the same state as that of stage *n*, a shift pulse is applied to the terminal 44 of each of the stages simultaneously. Since the cryotron $B_n$ is resistive, this current pulse will flow through the conductor 10, the cryotron $D_n$, the conductor 11 through the winding 41' associated with the cryotron $C_{n+1}$ to render the cryotron $C_{n+1}$ resistive. The current in the path including this cryotron then begins to shift to the path including cryotron $A_{n+1}$ to thereby cause cryotrons $B_{n+1}$ and $C_{n+1}$ to be driven resistive and to permit the cryotron $D_{n+1}$ and the cryotron $A_{n+1}$ to change from their resistive state back to their superconductive state. Thus, the current previously flowing through cryotron $C_{n+1}$ will now flow through conductor 16', cryotron $A_{n+1}$, conductor 17', winding 18', conductor 19', winding 20', to the output designated "0" in the stage $n+1$. Now, the state of the various cryotrons in the stage $n+1$ is the same as the preceding stage and this particular state may be transferred successively along a line of similarly connected circuits in the same manner.

It should be noted that when shift pulses are applied simultaneously to the terminals 44 for all of the stages of the shift register of FIGURE 4*a*, the information bit in each stage is advanced to the next stage so that each stage of the register is both read out of and read into during each shift operation.

The windings 26 and 42 connected in inductive relation with the cryotrons A and C, respectively, in each of the stages permits a current pulse applied thereto between the applications of shift pulses to change the state of a particular stage.

Referring now to the circuit diagram shown in FIGURE 5*a* of the drawings, this circuit illustrates a modification of the circuit shown in FIGURE 2*a* to receive pulses of current instead of the continuous current $I_1$. Such current pulses are received by the parallel connection of the conductors 10 and 12 leading to the cryotrons D and B, respectively and the circuit may be termed a binary input trigger. One of these parallel circuits is formed by the conductor 10, cryotron D, conductor 31, winding 30 to a superconducting ground connection 11. The other parallel connection is through conductor 12, cryotron B, conductor 13, winding 14 to a superconducting ground connection 15. The current $I_2$ may follow any one of two parallel paths similarly as described in connection with FIGURE 2*a*. One path would be through the conductor 16, the cryotron A, the conductor 17, the winding 18, the conductor 19, and the winding 20 to an output designated "0." The other of the two parallel paths would be through the conductor 21, the cryotron C, the conductor 22, the winding 23, the conductor 24, and the winding 25 to an output designated "1."

The time constant of the circuits including the cryotrons B and D may be either relatively small or relatively large depending upon the use to which the circuit is to be put. Time charts illustrating the relative current flow for operations under each of these time constants are shown in FIGURES 5*b* and 5*c*.

For the instance when the circuit paths including the cryotrons B and D have a relatively small time constant, the cryotrons A and C will be provided with relatively large time constants. If a pulse of sufficient magnitude and duration is applied to the input, the cryotron B being resistive due to the $I_2$ current flow through the winding 18, this input current pulse after an initial transient will flow through cryotron D and the winding 30 associated with the cryotron A in order to render the cryotron A resistive. This will occur at the point $I'_A$, FIGURE 5*b*, at which point the current through the cryotron A begins to decrease, thereby permitting the current $I_C$ to begin increasing from the point $I'_C$. Shortly after the intersection of curves of these two currents, $I'_A$ and $I'_C$, the current $I_C$ which flows through the winding 23 on cryotron D renders the cryotron D resistive, which point is indicated at $I'_D$ in FIGURE 5*b*. At this point, the input current pulse through the conductor 10, $I_D$ on the curve in FIGURE 5*b*, begins decreasing rapidly and, correspondingly, the current $I_B$ begins to increase rapidly in conductor 12 and the cryotron B. However, the input current pulse is terminated before the current $I_B$ exceeds the value at the point $I'_B$ in FIGURE 5*b* and the current $I_B$ decreases rapidly to the point $I''_B$. After this cycle of operation, the current $I_2$, normally flowing through the path including the cryotron A, now flows through the path including the cryotron C to provide an output at the terminal designated "1." The above cycle may be repeated in reverse by the next successive input current pulse to the terminals 10—12.

For the instance where cryotrons B and D have relatively large time constants and the cryotrons A and C have relatively small time constants, the curves in FIGURE 5*c* show the relative divisions of the respective currents, which division of currents is similar in operation to that just described in connection with FIGURE 5*b*.

Where the change in the output of one stage is used to drive another similar stage, the method shown in FIGURE 5*b* is the most desirable to ensure complete switching of the second successive stage. On the other hand, where rapid switching of one stage is required, the relative arrangement of the time constants of the various cryotrons as shown in FIGURE 5*c* is preferable.

It is to be understood that the above-described arrangements are simply illustrative of the application of the principles of the invention. Numerous other arrangements may be readily devised by those skilled in the art which will embody the principles of the invention and fall within the spirit and scope thereof.

I claim:

1. A cryogenic electrical circuit comprising at least first and second current paths in parallel and having a predetermined inductive-resistive time constant, each of said current paths having at least one cryotron as an operative component therewith, a first source of electric current connected to provide a first electric current flow through said parallel current paths, first winding means connected electrically in series with said first current path and positioned in magnetic field applying relation with the cryotron in said second current path, second winding means connected electrically in series with said second current path and positioned in magnetic field applying relation with the cryotron in said first path, a current input winding positioned in magnetic field applying relation with one cryotron in said first current path, a third current path including at least one superconductive gate conductor, a control winding in series in said third path with said gate conductor and positioned in magnetic field applying relation with one cryotron in said second current path, said control winding having a large inductive-resistive time constant relative to the time constant of said first and second current paths, a second source of electric current for said third path, and inductor means connected electrically in series with said first path and inductively coupled with the gate conductor of said third path.

2. The electrical circuit as set forth in claim 1 wherein said second source of electric current is connected to a fourth current path in parallel with said third current path.

3. The electrical circuit as set forth in claim 2 wherein a superconductive gate conductor is connected electrically in series with said fourth path to control the current flow therein.

4. The electrical circuit as set forth in claim 3 wherein an additional inductor means is electrically connected in series with said second path and is positioned in magnetic field applying relation with the gate conductor in said fourth current path for controlling the superconductivity thereof.

5. A cryogenic electrical circuit comprising first and second current paths in parallel and having a predetermined inductive-resistive time constant, each of said current paths having a cryotron as an operative component therewith, third and fourth current paths in parallel and having an inductive resistive time constant different from the time constant of said first and second current paths, a winding means connected electrically in series with said third current path and positioned in magnetic field applying relation with a cryotron in said first current path, a winding means connected electrically in series with said fourth current path and positioned in magnetic field applying relation with a cryotron in said second current path, a winding means connected electrically in series with said first current path and positioned in magnetic field applying relation with said cryotron in said second current path, and a winding means connected electrically in series with said second current path and positioned in magnetic field applying relation with said cryotron in said first current path.

6. The electrical circuit as set forth in claim 5 wherein a control winding means is positioned in magnetic field applying relation with a cryotron in one of said current paths to maintain a predetermined magnetic bias thereon.

7. A cryogenic electrical circuit adapted for interconnection with another similar cryogenic electrical circuit for operation as a multi-stage ring circuit, each stage comprising first and second current paths in parallel and having a predetermined inductive-resistive time constant, third and fourth current paths in parallel and having an inductive-resistive time constant different from the time constant of said first and second current paths, at least one cryotron associated with each of said current paths, separate winding means connected electrically in series with said first and said second current paths and positioned respectively in magnetic field applying relation with a cryotron in said third and fourth current paths, separate winding means connected electrically in series with said third and fourth current paths and positioned respectively in magnetic field applying relation with a cryotron in said first and second current paths, and a control winding means connected in series with one of the current paths and positioned in magnetic field applying relation with a cryotron in one of the current paths in a succeeding stage.

8. The electrical circuit as set forth in claim 7 wherein said control winding means is connected electrically in series with said fourth current path and positioned in magnetic field applying relation with a cryotron in the first current path of the next succeeding stage.

9. The electrical circuit as set forth in claim 8 wherein an additional winding means is connected electrically in series with said third current path and positioned in magnetic field applying relation with a cryotron in the second current path of the next succeeding stage such that the ring will operate as a single step shift register.

10. The electrical circuit as set forth in claim 7 wherein a separate set winding means is positioned in magnetic field applying relation with a cryotron in one of said first and second current paths.

11. An electrical circuit comprising a first current source, first and second superconductor current paths connected in parallel circuit relationship with said first current source, a second current source, third and fourth superconductor current paths connected in parallel circuit relationship with said second current source, means series connected in said third path for controlling the superconductive state of a portion of said first path in response to electric current flow in said third path, and means connected in said first path in series with said portion of said first path for controlling the superconductive state of a portion of said fourth path in response to current flow in said first path.

12. The circuit of claim 11 wherein there is also provided means series connected in said second path for controlling in response to current flow in said second path the state of a portion of said third path connected in series with said means connected in said third path.

13. The circuit of claim 12 wherein there is also provided means connected in said fourth path in series with said portion of said fourth path for controlling in response to current flow in said fourth path the superconductive state of a portion of said second path connected in series with said means connected in said second path.

14. The circuit of claim 13 wherein said first and second paths form a first inductive-resistive circuit having a first time constant and said third and fourth paths form a second inductive-resistive circuit having a second time constant different than said first time constant.

15. The circuit of claim 14 wherein said second current source supplies discrete input current signals and said electrical circuit is operable as a binary input trigger.

16. The circuit of claim 14 wherein said first and second current sources supply current continuously and said electrical circuit is operable as a multivibrator.

17. An electrical circuit comprising first and second superconductor paths, means connected in parallel with said first and second paths for supplying a first predetermined current thereto, third and fourth superconductor paths, means connected in parallel with said third and fourth paths for applying a second predetermined current thereto, first means series connected in one of said first and second paths effective in response to current flow in that path to apply magnetic field to a first portion of one of said third and fourth paths for controlling the state, superconductive or normal, of said first portion, second means series connected in one of said third and fourth paths effective in response to current flow in that path to apply magnetic field to a second portion of one of said first and second paths for controlling the state, superconductive or normal, of said second portion.

18. The circuit of claim 17 wherein said first means is effective to drive said first portion resistive when a predetermined percentage of said first current is flowing therein, and said second means is effective to drive said second portion resistive when a predetermined percentage of said second current is flowing therein, said predetermined percentage of said first current being different than said predetermined percentage of said second current.

19. A bistable device comprising first and second superconductor current paths, first means connected in parallel circuit relationship with said first and second paths for supplying current thereto, third and fourth superconductor current paths, second means connected in parallel circuit relationship with said third and fourth paths for supplying current thereto; first, second, third and fourth control conductors series connected in said first, second, third and fourth paths, respectively; first, second, third and fourth gate conductors series connected in said first, second, third and fourth paths, respectively; said first control conductor being arranged in magnetic field applying relation with said fourth gate conductor, said second control conductor being arranged in magnetic field applying relation with said third gate conductor, said third control conductor being arranged in magnetic field applying relation with said first gate conductor, and said fourth control conductor being arranged in magnetic field applying relation with said second gate conductor.

20. The bistable device of claim 19 wherein said first and second paths form a circuit having a first inductive-resistive time constant and said third and fourth paths form a circuit having a second inductive-resistive time constant different than said first time constant.

21. An electrical circuit comprising first and second circuits respectively connected to first and second current supply means, each said circuit comprising a plurality of superconductor current paths connected in parallel circuit relationship with the current supply means to which they are connected, said paths including superconductor gate conductors and superconductor control conductors for applying magnetic fields to said gate conductors, the distribution of current from the supply means through the plurality of paths in each of said circuits being controlled by the distribution of current from the supply means through the plurality of paths in the other of said circuits, said first circuit having an inductive-resistive time constant different from said second circuit.

22. An electrical circuit comprising first and second superconductor circuits, an electrical current supply means, said first superconductor circuit including first and second superconductor paths connected in parallel across said electrical current supply means; said second superconductor circuit including third and fourth superconductor paths connected in parallel across said electrical current supply means, a first control conductor connected in said first path of said first circuit arranged in magnetic field applying relationship to a portion of said third path of said second circuit whereby, when a current from said electrical current supply means is directed through said first path, said portion of said third path is driven resistive so that current supplied by said electrical current supply means to said second circuit is directed through said fourth path, a second control conductor connected in said fourth path and arranged in magnetic field applying relationship to a portion of said first path whereby, when a current from said electrical current supply means is directed through said fourth path, said portion of said first path is driven resistive so that said current supplied by said electrical current supply means to said first circuit is directed through said second path.

23. Apparatus comprising, a first superconductive current path including first gate conductor means, a second parallel superconductive current path including second gate conductor means, first and second inductor means electrically coupled in, respectively, said second and first paths in series with, respectively, said second and first conductor means and inductively coupled with, respectively, said first and second conductor means to produce oppositely varying changes of current in said two paths, each of said paths having an inductive-resistive time constant determining the rate at which said changes occur, and a superconductive single-stage circuit responsive to a change of current in at least one of said paths to vary the current in the other of said paths in a direction opposing said last-named current change and having an inductive-resistance time constant exceeding that of either of said paths to render the response rate of said circuit slower than the rate of occurrence of such current change.

24. Apparatus as in claim 23 in which said circuit comprises a third superconductive path including third gate conductor means and third inductor means electrically in series with said third conductor means and inductively coupled with the gate conductor means of said other path, and fourth inductor means connected in said one path to be energized by current therein and inductively coupled with said third conductor means to control the current in said third path as a function of the current in said one path.

25. Apparatus comprising, a first superconductive current path including first gate conductor means, a second parallel superconductive current path including second gate conductor means, first and second inductor means electrically coupled in, respectively, said second and first paths in series with, respectively, said second and first conductor means and inductively coupled with, respectively, said first and second conductor means to produce oppositely varying changes of current in said two paths, each of said paths having an inductive-resistance time constant determining the rate at which said changes occur, and a superconductive single-stage circuit having an inductive-resistive time constant exceeding that of either of said paths and responsive to a change of current in at least one of said paths to delayedly control the current in the other of said paths so as to produce a reversal of said last-named current change after a time delay determined by said time constant of said circuit.

26. Apparatus as in claim 25 in which said circuit is a two-state circuit which changes from a first to a second state in the course of delayedly controlling the current in said other path, said apparatus further comprising means responsive to said reversal of current change to restore said two-state circuit to said first state.

27. Apparatus as in claim 26 in which said apparatus is a one-shot multi-vibrator having a period determined by the delayed controlling action of said circuit.

28. Apparatus as in claim 26 in which said two-state circuit is adapted in response to a current change in either one of said two paths to delayedly control the current in the other of said paths to produce a reversal of said last-named current change after a time delay, said two-state circuit rendering said apparatus a free-running multi-vibrator.

29. A cryogenic electric circuit comprising first and second current paths in parallel and having a predetermined inductive-resistive time constant, each of said current paths including a cryotron connected electrically in series therein to control current flow therein, third and fourth current paths in parallel and having an inductive-resistive time constant different from the time constant of said first and second current paths, each of said third and fourth paths including a cryotron connected electrically in series therein to control current flow therein, first and second winding means electrically connected in series with, respectively, said first and second current paths and positioned in magnetic field applying relation with, respectively, the cryotrons in said third and fourth current paths, and third and fourth winding means electrically connected in series with, respectively, said third and fourth current paths and positioned in magnetic field applying relation with, respectively, the cryotrons in said second and first current paths.

References Cited in the file of this patent

UNITED STATES PATENTS 2,832,897 Buck ---------------- Apr. 29, 1958

OTHER REFERENCES

The Cryotron—A Superconductor Computer Component, by D. A. Buck, IRE, April 1956, pages 485–493.

UNITED STATES PATENT OFFICE
CERTIFICATE OF CORRECTION

Patent No. 3,023,324 February 27, 1962

James B. Mackay

It is hereby certified that error appears in the above numbered patent requiring correction and that the said Letters Patent should read as corrected below.

Column 3, line 29, for "al" read -- all --; column 6, line 59, for "1a except that a coil 40' is placed" read -- fed through a winding 30 positioned --.

Signed and sealed this 3rd day of July 1962.

(SEAL)
Attest:

ERNEST W. SWIDER
Attesting Officer

DAVID L. LADD
Commissioner of Patents